(12) United States Patent
Feller et al.

(10) Patent No.: US 7,695,003 B2
(45) Date of Patent: Apr. 13, 2010

(54) SIDE PROTECTION DEVICE

(75) Inventors: Jens Feller, Ulm (DE); Rainer Heuschmid, Ulm (DE); Thomas Sievers, Ulm (DE); Georg Rasch, Bibertal-Bühl (DE)

(73) Assignee: Takata-Petri AG, Aschaffenburg (DE)

( * ) Notice: Subject to any disclaimer, the term of this patent is extended or adjusted under 35 U.S.C. 154(b) by 262 days.

(21) Appl. No.: 11/459,252

(22) Filed: Jul. 21, 2006

(65) Prior Publication Data

US 2007/0057492 A1    Mar. 15, 2007

Related U.S. Application Data

(63) Continuation of application No. PCT/DE2005/000086, filed on Jan. 20, 2005.

(30) Foreign Application Priority Data

Jan. 23, 2004    (DE)    ........................ 10 2004 004 544
Apr. 13, 2004    (DE)    ........................ 10 2004 018 665

(51) Int. Cl.
*B60R 21/20*    (2006.01)
(52) U.S. Cl. .................... 280/730.2; 280/739
(58) Field of Classification Search .............. 280/729, 280/730.2, 739, 743.1, 743.2; *B60R 21/28*
See application file for complete search history.

(56) References Cited

U.S. PATENT DOCUMENTS

| 3,511,519 | A | | 5/1970 | Martin |
| 5,603,526 | A | * | 2/1997 | Buchanan .................... 280/739 |
| 5,718,450 | A | * | 2/1998 | Hurford et al. ............ 280/730.2 |
| 5,722,685 | A | | 3/1998 | Eyrainer |
| 5,924,721 | A | * | 7/1999 | Nakamura et al. ....... 280/730.2 |
| 6,142,517 | A | * | 11/2000 | Nakamura et al. .......... 280/739 |
| 6,695,340 | B2 | | 2/2004 | Gromodka et al. |
| 6,976,702 | B2 | * | 12/2005 | Yokota et al. ............ 280/730.2 |
| 2001/0006289 | A1 | | 7/2001 | Heilig |
| 2002/0113416 | A1 | * | 8/2002 | Uchida ........................ 280/729 |
| 2004/0012179 | A1 | | 1/2004 | Pinsenschaum et al. |
| 2004/0262898 | A1 | * | 12/2004 | Bauer et al. .................. 280/739 |
| 2008/0023945 | A1 | | 1/2008 | Zauritz et al. |

FOREIGN PATENT DOCUMENTS

| DE | 41 37 810 C1 | 4/1993 |
| DE | 196 33 883 A1 | 2/1998 |
| DE | 196 40 322 A1 | 3/1998 |
| DE | 298 04 005 U1 | 8/1998 |
| DE | 197 33 599 A1 | 2/1999 |
| DE | 299 06 477 U1 | 9/1999 |

(Continued)

*Primary Examiner*—Paul N Dickson
*Assistant Examiner*—Robert A Coker
(74) *Attorney, Agent, or Firm*—Foley & Lardner LLP

(57) ABSTRACT

The disclosed occupant protection device for a vehicle can include at least one airbag that protects a vehicle occupant in the event of a collision of the vehicle. The airbag can have an outflow opening through which the gas can exit the side airbag and/or has an overflow opening located inside the airbag. After the occupant protection device has been tripped, the side airbag can be inflated and be positioned laterally next to the vehicle occupant in such a manner that the outflow opening and/or the overflow opening is closed, is throttled, or remains open according to the body size of the vehicle occupant.

19 Claims, 7 Drawing Sheets

FOREIGN PATENT DOCUMENTS

| | | |
|---|---|---|
| DE | 200 00 144 U1 | 6/2000 |
| DE | 100 20 729 A1 | 10/2001 |
| DE | 100 32 791 A1 | 1/2002 |
| DE | 10 2004 006 185 A1 | 9/2005 |
| DE | 102004006185 A1 * | 9/2005 |
| EP | 0 771 698 A2 | 5/1997 |
| EP | 1 044 855 B1 | 10/2000 |
| WO | WO 2006/050757 A1 | 5/2006 |

* cited by examiner

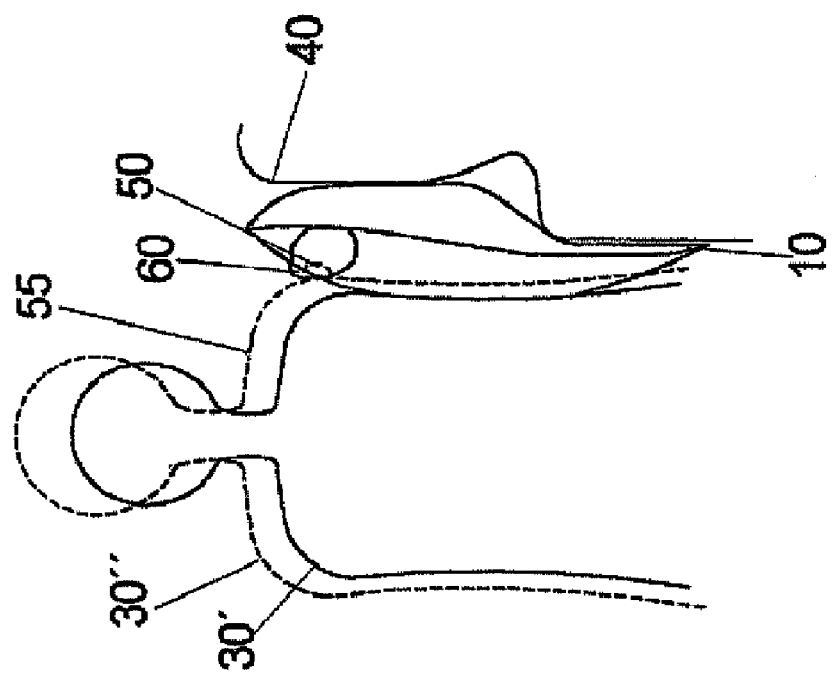
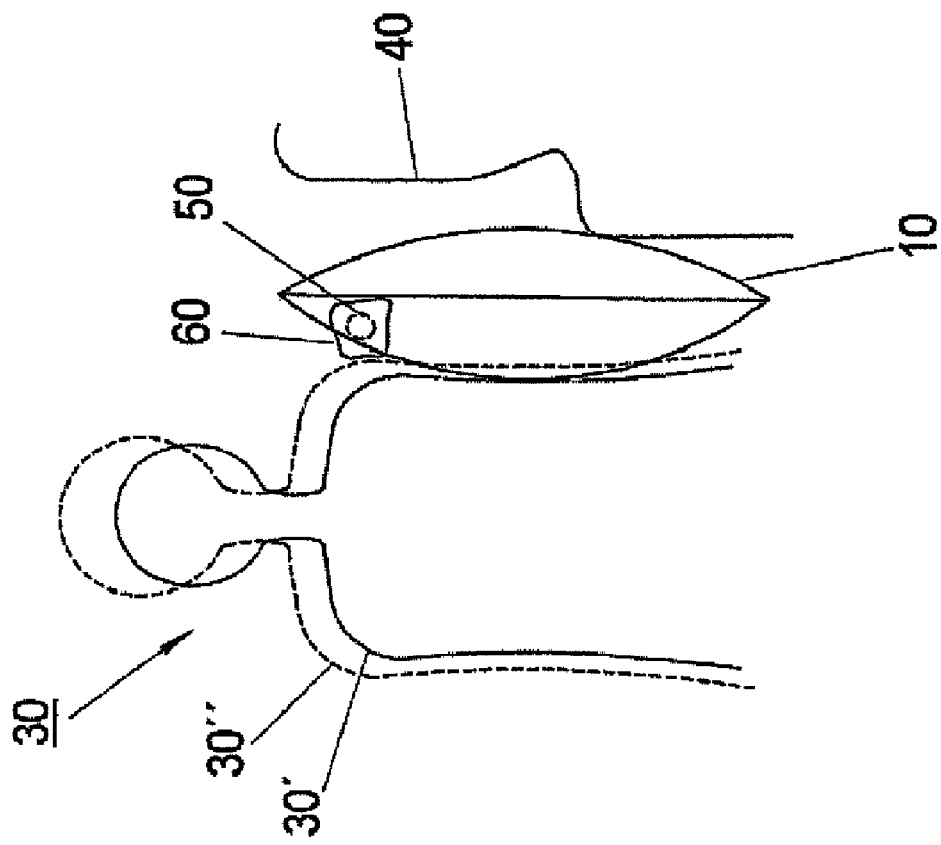

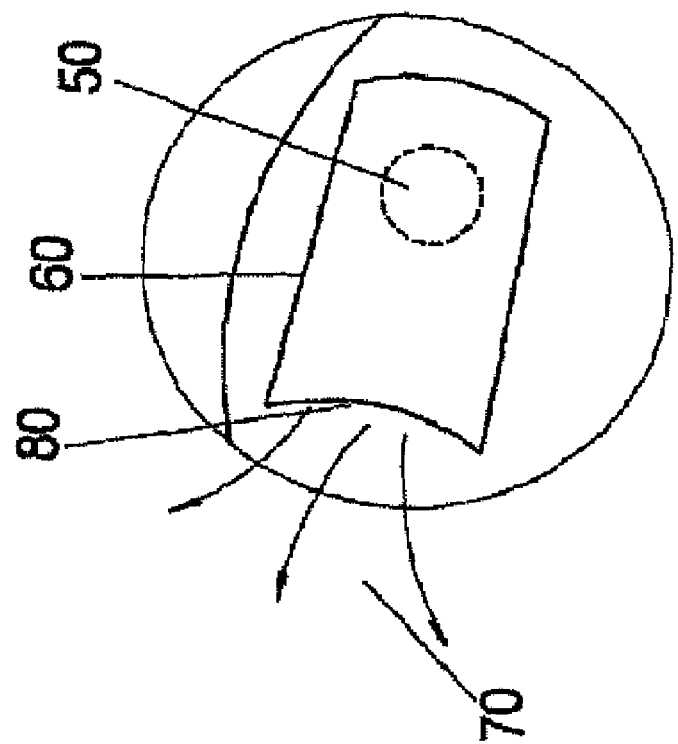
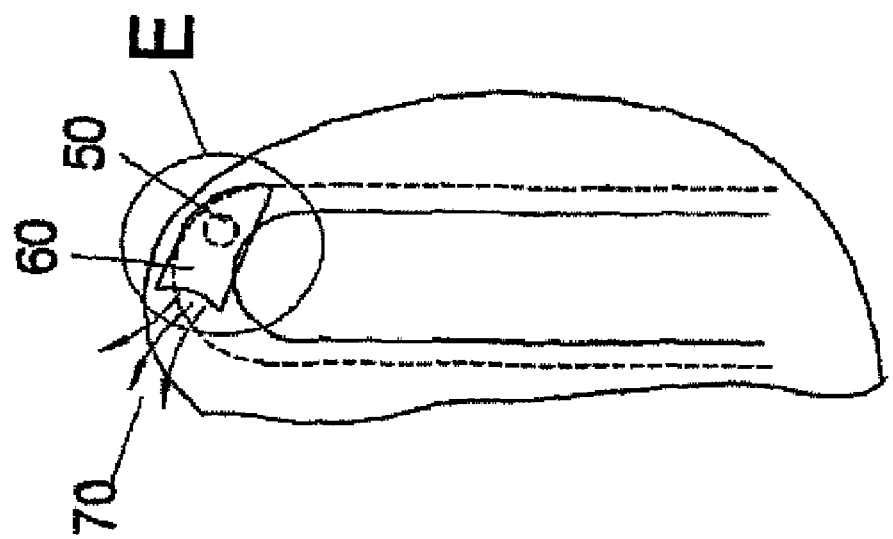

SIDE PROTECTION DEVICE

This application is a continuation of PCT/DE2005/000086, which has an international filing date of Jan. 20, 2005; this International Application was not published in English, but was published in German as WO 2005/070729.

BACKGROUND

The invention relates to an occupant side protection device, in particular for a motor vehicle, with at least one side airbag which protects a vehicle occupant in the event of a side collision of the vehicle.

An occupant side protection device of this type is known, for example, from U.S. Pat. No. 6,695,340 B2. To protect a vehicle occupant this previously known occupant side protection device has a gas generator which, in the event of an accident, inflates a side airbag of the occupant side protection device. In the deployed state, the side airbag covers a side wall section of the vehicle, thus preventing the vehicle occupant, such as the vehicle occupants head, from striking against the side wall section. In addition to its main chamber or working chamber covering the side wall section, the airbag has finger-like projections which are intended to be used for preventing the main chamber from bending away from the side wall.

The present application is based on the object of describing a side protection device which provides a particularly high level of safety for the vehicle occupant to be protected.

SUMMARY

The object of the present application can be achieved by making a provision for the side airbag to have an outflow opening from which gas can flow from the side airbag to the outside and/or to have an overflow opening located inside the airbag. According to one embodiment of the present invention, after the occupant side protection device has been triggered, the side airbag is inflated and positioned laterally next to the vehicle occupant in such a manner that the outflow opening and/or the overflow opening is closed, remains open, or is throttled as a function of body size, e.g., as a function of the size of the vehicle occupant or as a function of the size of predetermined body parts of the vehicle occupant.

A substantial advantage of the occupant side protection device according to an embodiment of the present invention resides in the fact that the inflation behavior of the side airbag can be set individually to the vehicle occupant. As a result, optimum positioning of the side airbag and the best possible protective effect of the side airbag can be ensured.

The side airbag can be preferably positioned between the vehicle occupant and an intruding side wall of the vehicle in such a manner that the side airbag immediately provides protection from the intruding side wall and/or a vehicle object connected to the intruding side wall. As an alternative or in addition, the side airbag can also provide protection from other hazards, for example from other objects integral to the vehicle, from objects external to the vehicle such as parts of another vehicle involved in the accident, from other occupants in the vehicle, or from occupants of another vehicle involved in the accident.

In the case of vehicle occupants whose body size exceeds a predetermined minimum size, the outflow opening or the overflow opening can be completely or partially closed or throttled in the event of an accident. In the case of a vehicle occupant whose body size falls short of the predetermined minimum size, the outflow opening or the overflow opening preferably remains open in the event of an accident.

For example, it can be established whether the vehicle occupant is larger or smaller than the predetermined minimum size with reference to the shoulder height of the vehicle occupant. A closing or throttling of the outflow opening or of the overflow opening may preferably take place by means of the shoulder region or the upper arm region of the vehicle occupant. The outflow opening or the overflow opening can be preferably arranged in such a manner that a closing or throttling of the opening can occur by the opening being pinched off or covered by the shoulder or the upper arm region of the vehicle occupant and the intruding side wall.

A plurality of outflow openings can be arranged in the side airbag in order to achieve a multi-stage setting of the gas pressure of the side airbag as a function of the size of the occupant.

An outflow passage can be preferably connected to the outflow opening and can deflect the gas emerging through the outflow opening away from the vehicle occupant. Injuries due to the hot gases that emerge from the airbag can be prevented by the outflow passage. The outflow passage can be formed, for example, by a covering element which is arranged between the vehicle occupant and the outflow opening.

The outflow passage may be preferably assigned to all of the outflow openings of the side airbag in order to achieve a safe conducting away flow of all gas that emerges from the openings. As an alternative, all of the outflow openings of the side airbag can be respectively assigned an individual outflow passage which deflects the gas emerging from the particular outflow opening away from the vehicle occupant.

In order to achieve protection of the upper body of the occupant, the side airbag preferably has a thorax chamber. The outflow opening can be arranged, for example, in the upper region of the thorax chamber.

For particularly comprehensive protection of the occupant, the side airbag can preferably have a head chamber and a thorax chamber. The overflow opening can be arranged, for example, between the head chamber and the thorax chamber. The side airbag can be preferably designed in such a manner that, in the event of the side wall penetrating the thorax chamber of the side airbag, gas is passed over from the thorax chamber into the head chamber as long as the overflow opening is open.

In addition to the head chamber and the thorax chamber, the side airbag can also have one or more further chambers in order further to improve the protection of the occupant.

The side airbag can be arranged, for example, in the door region of the vehicle or in the region of a vehicle seat.

It is to be understood that both the foregoing general description and the following detailed descriptions are exemplary and explanatory only, and are not restrictive of the invention as claimed.

BRIEF DESCRIPTION OF THE DRAWINGS

The features, aspects and advantages of the present invention will become apparent from the following description, appended claims, and the accompanying exemplary embodiments shown in the drawings, which are briefly described below.

FIGS. 4 to 7 show an occupant protection device according to a second embodiment of the present invention with an outflow opening with a covering element.

DETAILED DESCRIPTION

Embodiments of the present invention is explained below with reference to the figures. In the figures, the same reference numbers are used for comparable or identical components.

Figure 1:
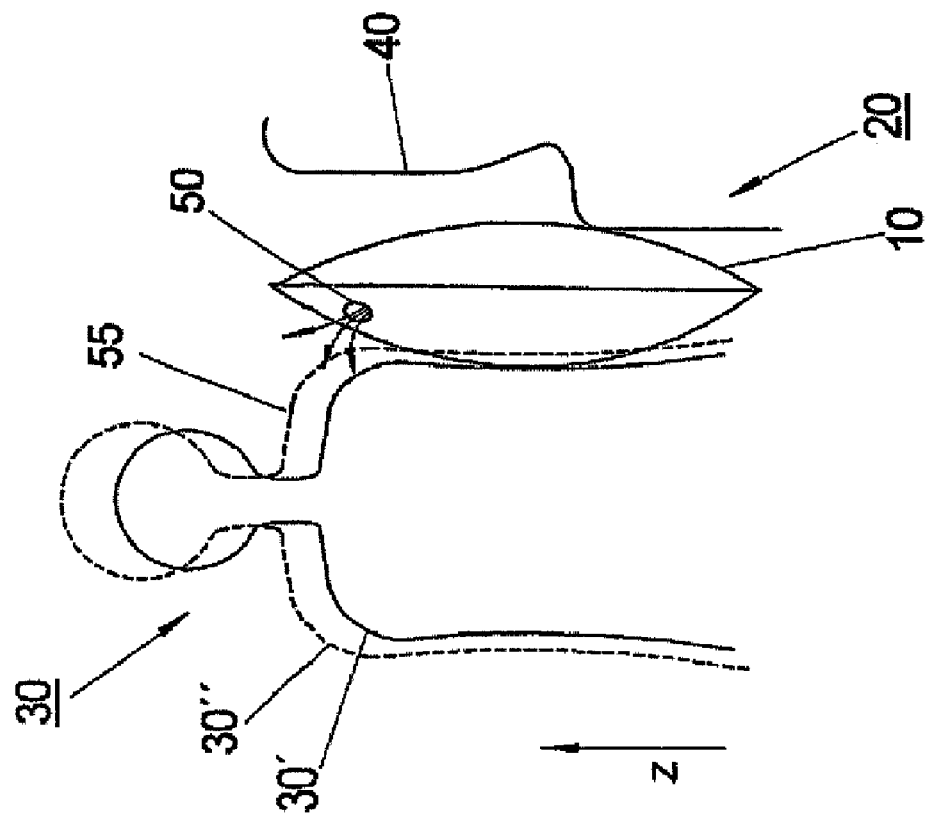

In FIG. 1, a side airbag 10 of an occupant protection device 20 (otherwise not further illustrated in detail) can be seen. The side airbag has already been inflated because of an accident. The occupant protection device 20 has a control device (not shown) which, in the event of an accident, ignites a gas generator (also not shown in FIG. 1) with which the side airbag 10 is inflated.

The side airbag 10 can be arranged, for example, between a vehicle occupant 30 and a vehicle wall 40, such as a side wall or vehicle door. Alternatively, the side airbag 10 could also be arranged at another location.

FIG. 1 illustrates two different body sizes for the vehicle occupant 30: a small vehicle occupant 30' is shown by solid lines and a large vehicle occupant 30" illustrated by dashed lines.

The large vehicle occupant 30" has a body size or occupant size which lies above a predetermined minimum size. The small vehicle occupant 30' has a body size or occupant size which is smaller than the predetermined minimum size.

It can be seen in FIG. 1 that the side airbag 10 has an outflow opening 50 through which the gas blown into the side airbag 10 by the gas generator can leave the side airbag 10. In the state illustrated in FIG. 1, the vehicle occupant 30 is still far enough away from the vehicle wall 40 so that the outflow opening 50 is not yet covered by the vehicle occupant 30. Gas can therefore emerge from the side airbag 10 through the outflow opening 50.

Figure 2:
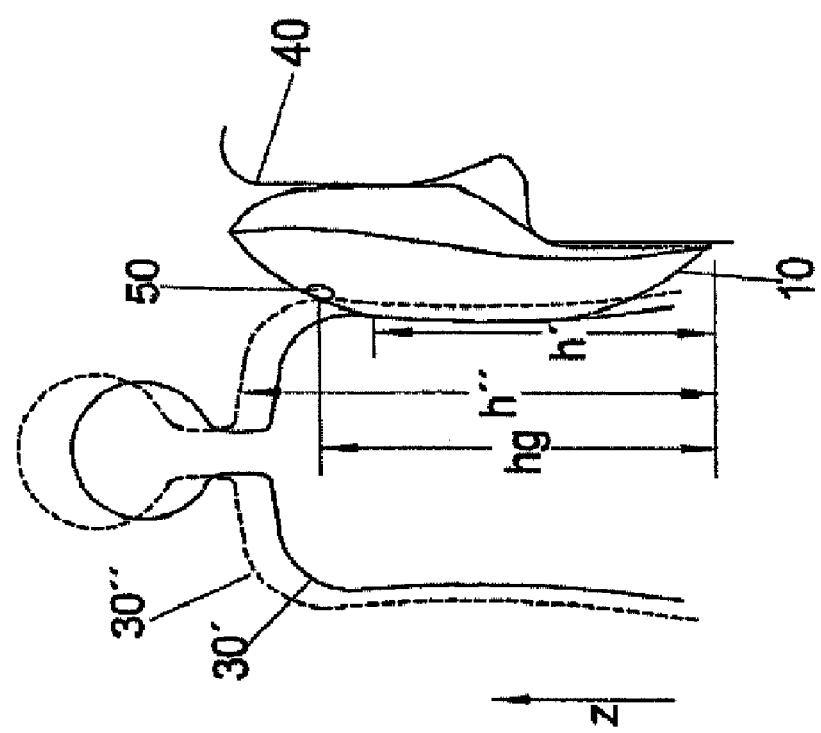
FIGS. 1 to 3 show an occupant protection device according to a first embodiment of the present invention with an outflow opening without a covering element.

FIG. 2 illustrates the further course of the accident in which the vehicle occupant 30 and the vehicle wall 40 have moved closer to each other. The side airbag 10 is now jammed between the vehicle occupant 30 and the vehicle wall 40.

Now, the difference between a small vehicle occupant 30' and a large vehicle occupant 30" affects the deployment. As can be seen in FIG. 2, the large vehicle occupant 30" completely covers the outflow opening 50 of the side airbag 10 with his shoulder 55 so that gas can no longer leave the side airbag 10 through the outflow opening 50. The side airbag 10 therefore can substantially retain its internal pressure, a result of which is a relatively large pushing-away or intercepting force exerted on the large vehicle occupant 30".

A complete covering of the outflow opening 50 by the large vehicle occupant 30" occurs because his shoulder 55 has a shoulder height h" which is greater than a limit height hg predetermined by the arrangement of the outflow opening 50. Therefore, in the case of large vehicle occupants 30":

$h">hg.$

In contrast, the small vehicle occupant 30' does not cover the outflow opening 50 of the side airbag 10 because his shoulder 55 does not reach the outflow opening 50 so that, even at the time of the accident illustrated in FIG. 2, the outflow opening 50 remains uncovered. The gas can therefore continue to emerge from the side airbag 10 through the outflow opening 50 so that, in comparison to the large vehicle occupant 30", a reduced pushing-away or intercepting force acts on the vehicle occupant 30'.

Therefore, for the shoulder height h' of the small vehicle occupant 30':

$h'<hg.$

In summary, it can therefore be established that, in the case of the occupant protection device according to FIGS. 1 and 2, the side airbag 10 exerts a pushing-away or intercepting force which is dependent on the size of the occupant. Specifically, a greater pushing-away or intercepting force is exerted on a large vehicle occupant 30" than on a small vehicle occupant 30'.

The previously-mentioned "predetermined minimum size" is established by the arrangement of the outflow opening 50. For example, the higher the outflow opening (as seen in the Z-direction of the vehicle) is arranged, the higher is also the minimum size of the vehicle occupant (for example, the shoulder height of the vehicle occupant) which has to be exceeded in order to achieve a closing of the outflow opening 50, resulting in the increased side airbag internal pressure.

Figure 3:
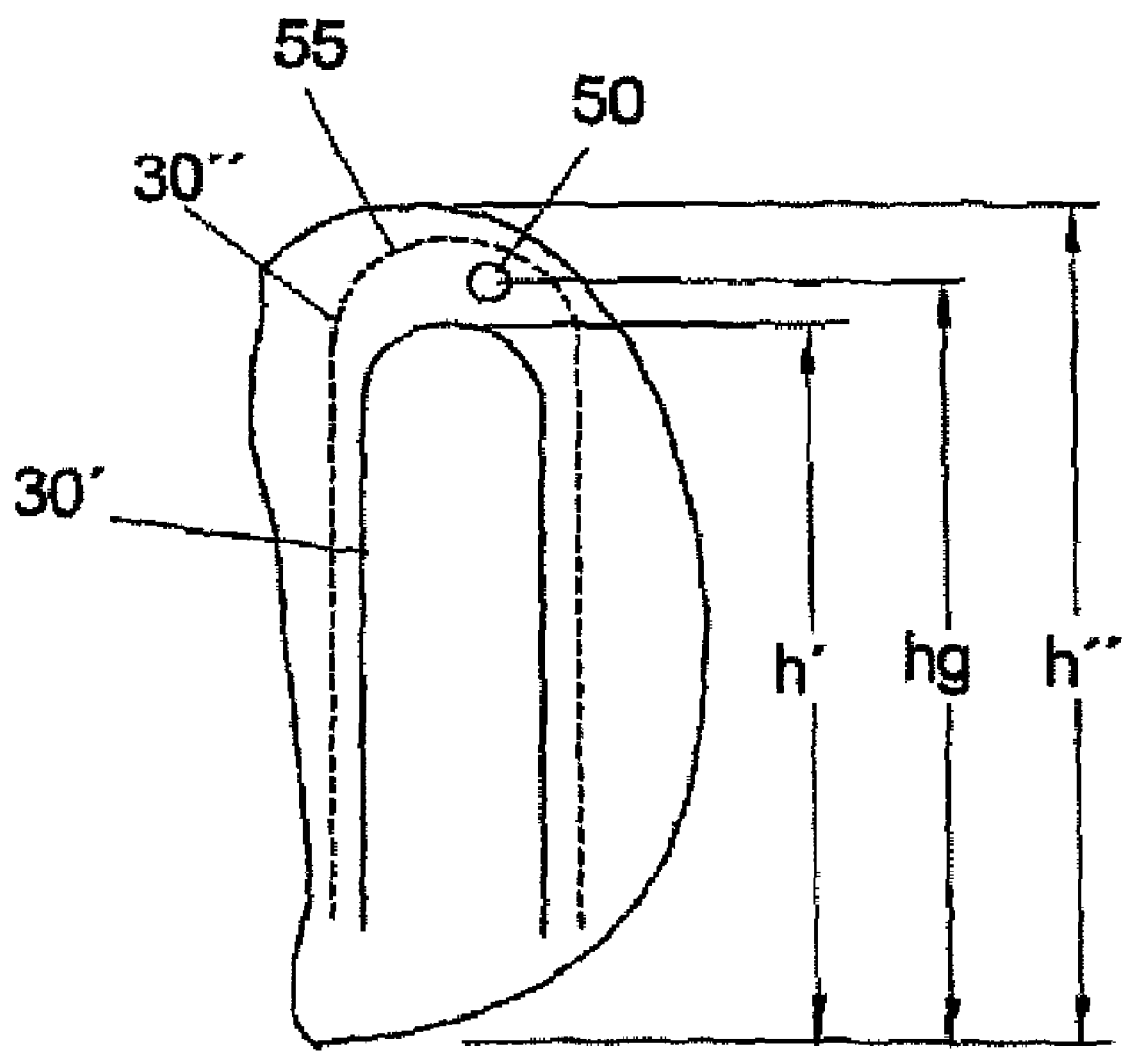

FIG. 3 shows the side airbag 10 according to FIGS. 1 and 2 in a side view. The outflow opening 50 through which the gas can flow out of the side airbag 10 can be seen. In addition, the shoulder region 55 of the large vehicle occupant 30" is illustrated schematically by dashed lines and the shoulder region 55 of the small vehicle occupant 30' is illustrated schematically by solid lines. It can be seen that the outflow opening 50 is covered by the shoulder 55 of the large vehicle occupant 30" whereas it remains uncovered in the case of the small vehicle occupant 30' because the shoulder height h' of the vehicle occupant 30' is not sufficient to close the outflow opening 50.

It can furthermore be seen in FIG. 3 that the outflow opening 50 lies immediately opposite the vehicle occupant 30' or 30" with the result that the gas emerging from the side airbag 10 is directed immediately at the vehicle occupant 30' or 30". In the event of a "hot-gas" gas generator, which produces hot gases to inflate the side airbag 10, a direct conducting away of the hot gases in the direction of the vehicle occupant 30' or 30" may lead to injuries.

In order to avoid such injuries, in the second embodiment of an occupant protection device shown in FIGS. 4 to 7, the side airbag 10 has a covering element 60 which covers the outflow opening 50 and deflects the gas stream emerging through the outflow opening 50 in such a manner that it flows off tangentially to the side airbag 10 and does not strike directly against the vehicle occupant.

The conducting away of the gas stream flowing out of the outflow opening 50 is illustrated in FIGS. 6 and 7 by means of three arrows with the reference number 70.

FIG. 7 shows a enlarged view of detail E of the configuration of the side airbag 10 illustrated in FIG. 6. The covering element 60 which forms an outflow passage 80 in the tangential direction to the surface of the side airbag 10 can be seen in detail in FIG. 7.

FIGS. 4 and 5 illustrate the interaction of the side airbag 10 with the vehicle occupant 30. It can be seen that a large vehicle occupant 30" presses the covering element 60 onto the outflow opening 50 with his shoulder 55 with the result of closing the outflow opening 50. Thus, further exiting of gas is prevented and an "increased" pushing-away or intercepting force is therefore formed for a large vehicle occupant.

In the case of a small vehicle occupant 30', the covering element 60 remains unobstructed so that gas can continuously emerge from the outflow opening 50 and a reduced pushing-away or intercepting force is produced.

In connection with the two embodiments of the occupant protection device according to FIGS. 1 to 7, the covering of the outflow opening 50 has been explained by way of example with reference to the shoulder 55 of the vehicle occupant 30 with a differentiation having been made between large and small vehicle occupants with reference to their shoulder height h' and h", respectively. Of course, other body parts or body proportions or body dimensions can also be used in order to differentiate between large and small vehicle occupants. For example, the body width or torso width can be used as a measure with "broad" vehicle occupants being regarded and treated as "large" while "slender" vehicle occupants are regarded and treated as "small."

Figure 8:
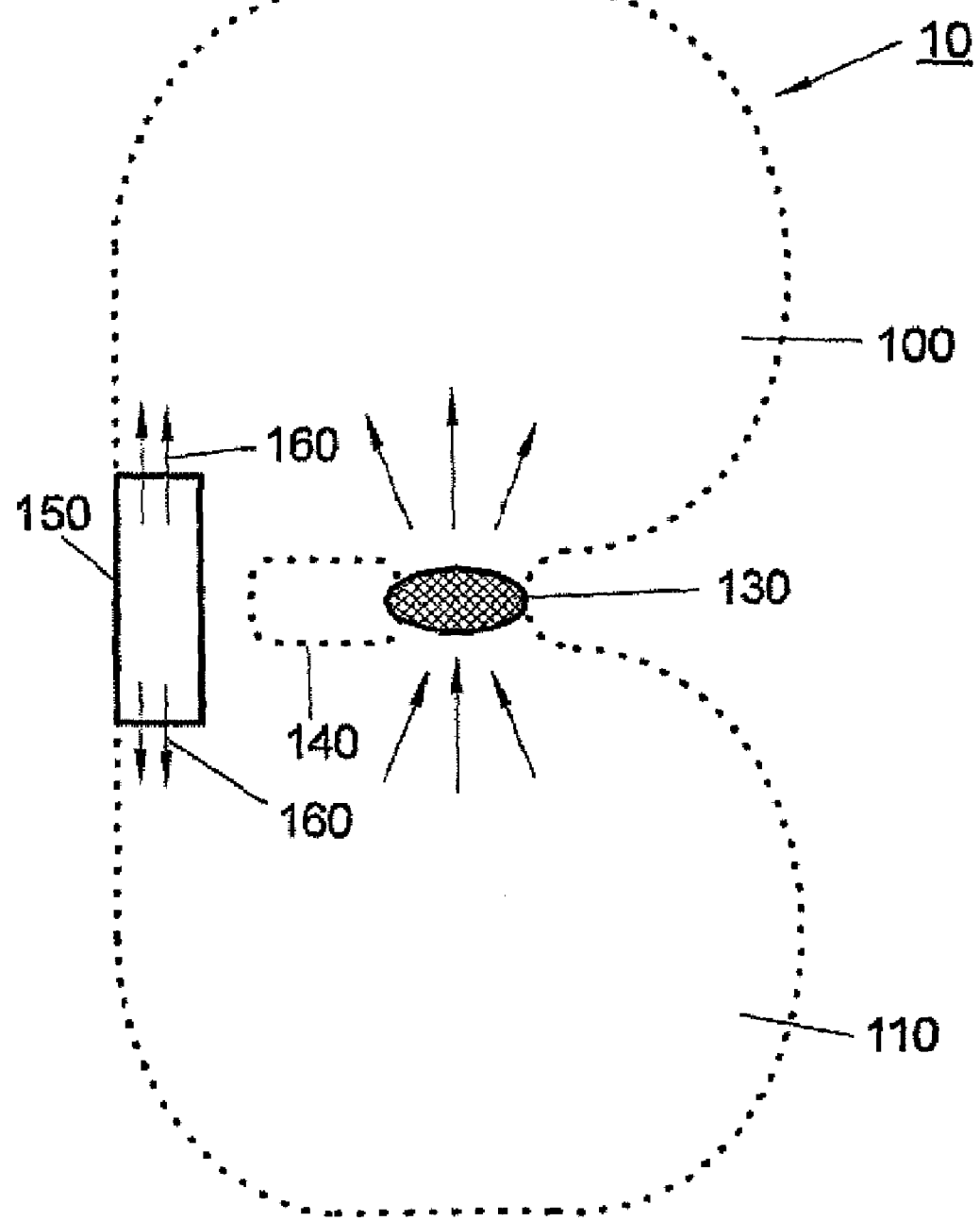
FIGS. 8 to 11 show an occupant protection device according to a third embodiment of the present invention with an overflow opening between two chambers of the side airbag.

FIGS. 8 to 11 show a third embodiment of the present invention. In FIG. 8, a side airbag 10 with two chambers 100 and 110 can be seen. The upper chamber 100 is a head chamber which protects the vehicle occupant's head in the event of an accident. The lower chamber 110 is a thorax chamber which protects the upper and lower body of the occupant.

In addition, an overflow opening 130 which permits a gas flow between the two chambers 100 and 110 can be seen. The cross section or diameter of the overflow opening is determined by the size and positioning of a tuck which is indicated by the reference number 140.

In the event of an accident, the side airbag 10 is inflated by means of a gas generator 150. During inflation, the gas generator 150 fills both the head chamber 100 and the thorax chamber 110 as indicated by the arrows 160 in FIG. 8.

Figure 9:
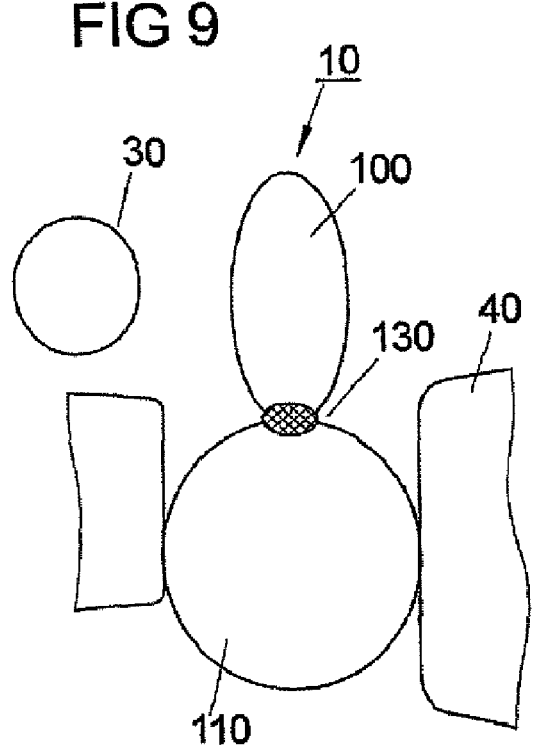
Figure 10:
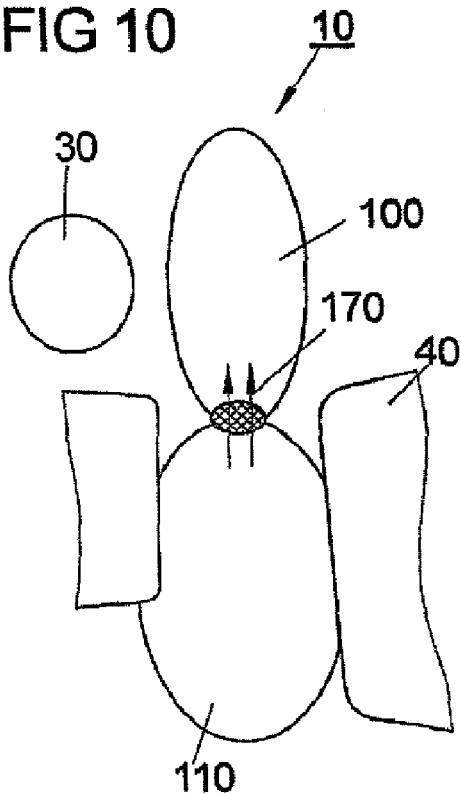
Figure 11:
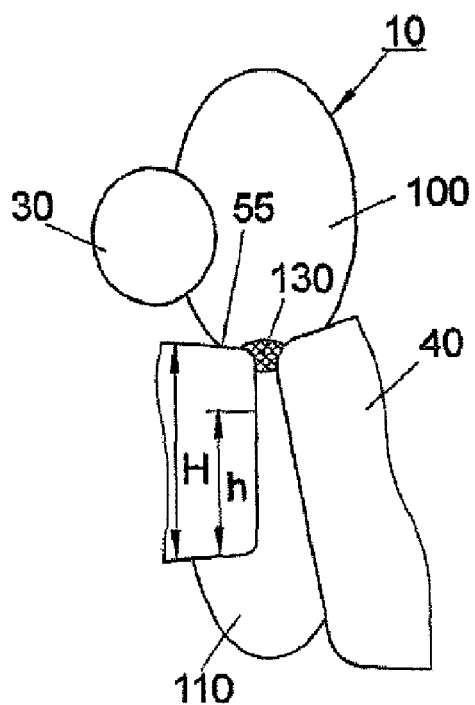

FIGS. 9 to 11 show the functioning of the side airbag 10 of FIG. 8 over the course of an accident. In FIG. 9, a side wall 40 is pressed in the direction of the occupant 30 in the event of a side impact accident. The side airbag 10 has already been inflated at the time shown in FIG. 9 and the inflated head chamber 100 and the inflated thorax chamber 110 can be seen.

FIG. 10 shows the accident situation at a later time than FIG. 9 in which the side wall 40 has moved closer to the vehicle occupant 30 as a result of which the thorax chamber 110 is compressed. This compression causes the gas pressure in the thorax chamber to be increased with the result that gas flows out of the thorax chamber 110 into the head chamber 100. The gas flow from the thorax chamber to the head chamber is indicated by arrows 170. As a result, the vole of the head chamber 100 increases, thus increasing the protective effect for the occupant's head.

As the course of the accident progresses, the side wall 40 continues to come closer to the vehicle occupant 30 as shown in FIG. 11. The intruding side wall 40 and the shoulder 55 of the vehicle occupant 30 cause the overflow opening 130 to now be compressed so that the gas throughflow in the direction of the head chamber 100 is throttled or choked. Under some circumstances, a complete closing of the overflow opening 130 can occur if the distance between the shoulder 55 and the side wall 40 becomes too small.

FIG. 11 shows that the overflow opening 130 is pinched off only if the shoulder height h of the vehicle occupant 30 is of sufficient height. If the shoulder 55 were to lie below the overflow opening 130 as indicated by the shoulder height h of a small vehicle occupant shown in FIG. 11, no throttling or interruption of the gas flow through the overflow opening 130 would occur. The embodiment of the occupant side protection device according to FIGS. 8 to 11 therefore operates as a function of body size in which the overflow opening 130 can be throttled, can close or can remain open as a function of size.

Figure 12:
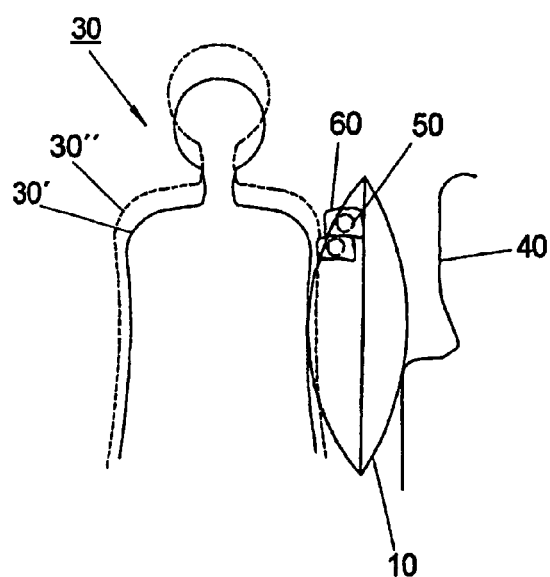
FIG. 12 shows a schematic view of an occupant protection device according to a fourth embodiment of the present invention with a plurality of outflow openings with each outflow opening individually assigned an outflow passage.

FIG. 12 shows an occupant protection device according to a fourth embodiment of the present invention with a plurality of outflow openings with each outflow opening individually assigned an outflow passage. The plurality of outflow openings is arranged in the airbag in such a manner that a multi-stage graduation of intercepting force is achieved as a function of a shoulder height of the occupant. As seen in FIG. 12, each outflow opening is individually assigned an outflow passage for deflecting gas emerging from their respective outflow openings.

Figure 13:
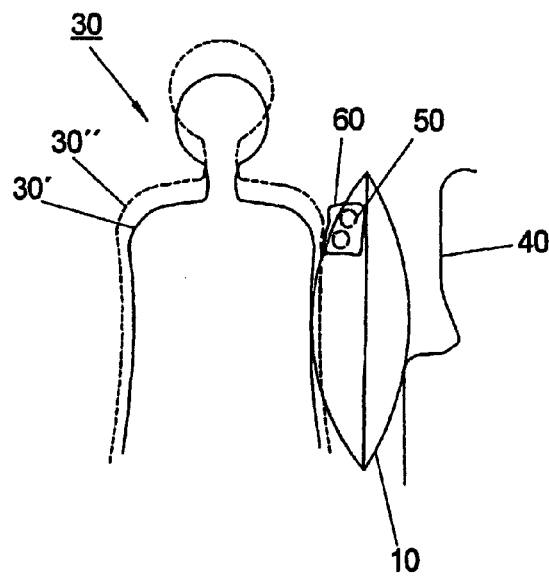
FIG. 13 shows a schematic view of an occupant protection device according to a fifth embodiment of the present invention with a plurality of outflow openings with an outflow passage assigned to all the outflow openings.

FIG. 13 shows an occupant protection device according to a fifth embodiment of the present invention with a plurality of outflow openings with an outflow passage assigned to all the outflow openings. The plurality of outflow openings is arranged in the airbag in such a manner that a multi-stage graduation of intercepting force is achieved as a function of a shoulder height of the occupant.

The novel "airbag deployment control" as a function of body size has been explained in conjunction with FIGS. 1 to 11 exclusively using the example of a side airbag. Of course, it is also possible for the control of the inflation behavior of an airbag as a function of body size, such as shoulder height to be used in all other types of airbags, such as front airbags, drivers' airbags, passengers' airbags, door-integrated airbag systems, head-thorax airbags, head side airbags, knee bags, pelvis bags, rear-impact airbags or other comparable airbags.

The priority applications German Patent Application No. 10 2004 004 544.5, filed Jan. 23, 2004, and German Patent Application No. 10 2004 018 665.0, filed Apr. 13, 2004, including the specification, drawings, claims, and abstract, are incorporated by reference herein in their entirety.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. An occupant protection device for a vehicle comprising:
    at least one airbag for protecting a vehicle occupant in an event of a collision;
    wherein the airbag has an outflow opening from which the gas can flow to outside of the airbag, an overflow opening located inside the airbag, or a combination thereof; and
    wherein the airbag is configured to inflate upon deployment and to be positioned laterally next to the vehicle occupant in such a manner that the outflow opening, the overflow opening, or a combination thereof is configured to be closed or throttled as a function of a body size of the vehicle occupant by direct interaction with the body of the vehicle occupant relative to a wall of the vehicle.

2. The occupant protection device as claimed in claim 1, wherein the airbag is a side airbag.

3. The occupant protection device as claimed in claim 1, wherein the outflow opening or the overflow opening is configured to be throttled or closed in the event of the collision when the body size of the vehicle occupant exceeds a predetermined minimum size.

4. The occupant protection device as claimed in claim 3, wherein the outflow opening or the overflow opening is configured to remain open in the event of the collision when the body size of the vehicle occupant is below the predetermined minimum size.

5. The occupant protection device as claimed in claim 1, wherein a plurality of outflow openings is arranged in the airbag in such a manner that a multi-stage graduation of intercepting force is achieved as a function of a shoulder height of the occupant.

6. The occupant protection device as claimed in claim 1, wherein an outflow passage is connected to the at least one outflow opening and is configured to deflect gas emerging through the outflow opening away from the vehicle occupant.

7. The occupant protection device as claimed in claim 6, wherein the outflow passage is formed by a covering element arranged over the outflow opening.

8. The occupant protection device as claimed in claim 6, wherein the airbag has a plurality of outflow openings, and wherein the outflow passage is assigned at least to two outflow openings of the airbag.

9. The occupant protection device as claimed in claim 6, wherein the airbag has a plurality of outflow openings, and wherein the outflow passage is assigned to all outflow openings of the airbag.

10. The occupant protection device as claimed in claim 6, wherein the airbag has a plurality of outflow openings, and wherein each outflow opening is individually assigned an outflow passage for deflecting gas emerging from their respective outflow openings.

11. The occupant protection device as claimed in claim 1, wherein the airbag is a side airbag having a thorax chamber, and wherein the outflow opening is arranged in an upper region of the thorax chamber.

12. The occupant protection device as claimed in claim 1, wherein the airbag is a side airbag configured to be arranged in a door region of the vehicle or on a vehicle seat.

13. The occupant protection device as claimed in claim 1, wherein the body size is a shoulder height of the vehicle occupant.

14. The occupant protection device as claimed in claim 13, wherein the airbag is configured to close or throttle the outflow opening or the overflow opening by means of a shoulder region or an upper arm region of the vehicle occupant.

15. The occupant protection device as claimed in claim 1, wherein the airbag is configured to inflate upon deployment and to be positioned laterally next to the vehicle occupant in such a manner that the outflow opening, the overflow opening, or the combination thereof is closed or throttled or remains open by direct interaction with the body of the vehicle occupant relative to the wall of the vehicle such that inflation behavior of the airbag can be set individually to the vehicle occupant.

16. The occupant protection device as claimed in claim 1, wherein the outflow opening is positioned such that the outflow opening faces toward the vehicle occupant.

17. An occupant protection device for a vehicle comprising:
   at least one airbag for protecting a vehicle occupant in an event of a collision;
   wherein the airbag has an outflow opening from which the gas can flow to outside of the airbag; and
   wherein the airbag is configured to inflate upon deployment and to be positioned laterally next to the vehicle occupant in such a manner that the outflow opening is configured to be closed or throttled as a function of a body size of the vehicle occupant by direct interaction with the body of the vehicle occupant.

18. An occupant protection device for a vehicle comprising:
   at least one airbag for protecting a vehicle occupant in an event of a collision;
   wherein the airbag has an outflow opening from which the gas can flow to outside of the airbag, an overflow opening located inside the airbag, or a combination thereof; and
   wherein the airbag is configured to inflate upon deployment and to be positioned laterally next to the vehicle occupant in such a manner that the outflow opening, the overflow opening, or a combination thereof is closed or throttled by a motion of a shoulder or an upper arm region of the vehicle occupant relative to a wall of the vehicle when the shoulder is equal to or greater than a predetermined height and is open or unthrottled by the motion of the shoulder or upper arm region of the vehicle occupant relative to the wall of the vehicle when the shoulder is less than a predetermined height.

19. The occupant protection device as claimed in claim 17, wherein the airbag is configured to inflate upon deployment and to be positioned laterally next to the vehicle occupant in such a manner that the outflow opening is closed or throttled or remains open by direct interaction with the body of the vehicle occupant such that inflation behavior of the airbag can be set individually to the vehicle occupant.

* * * * *